United States Patent
Chandler

(10) Patent No.: US 8,814,089 B2
(45) Date of Patent: *Aug. 26, 2014

(54) AIRCRAFT CLASS DIVIDER

(71) Applicant: Heath Tecna Inc., Bellingham, WA (US)

(72) Inventor: Glenn Casey Chandler, Bellingham, WA (US)

(73) Assignee: Heath Tecna Inc., Bellingham, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/671,324

(22) Filed: Nov. 7, 2012

(65) Prior Publication Data

US 2014/0124623 A1    May 8, 2014

(51) Int. Cl.
*B64D 11/00*    (2006.01)

(52) U.S. Cl.
USPC ........................................................ 244/118.5

(58) Field of Classification Search
USPC .................. 244/118.1, 118.5, 129.4, 129.5; 105/323; 52/29, 32, 64, 67, 69, 71, 52/238.1, 243.1; 312/248
See application file for complete search history.

(56) References Cited

U.S. PATENT DOCUMENTS

| | | | |
|---|---|---|---|
| 5,165,626 A | 11/1992 | Ringger et al. | |
| 5,577,358 A | 11/1996 | Franke | |
| 5,649,721 A | 7/1997 | Stafford et al. | |
| 5,816,534 A | 10/1998 | Schumacher | |
| 6,523,779 B1 * | 2/2003 | Michel | 244/118.5 |
| 7,530,529 B2 | 5/2009 | Bock | |
| 8,118,258 B2 | 2/2012 | Mosler et al. | |
| 8,123,165 B2 * | 2/2012 | Breuer et al. | 244/118.5 |
| 8,550,143 B2 * | 10/2013 | Breuer et al. | 160/323.1 |
| 8,556,212 B2 * | 10/2013 | Breuer et al. | 244/118.6 |
| 2012/0273613 A1 * | 11/2012 | Ulbrich-Gasparevic et al. | 244/118.1 |

* cited by examiner

*Primary Examiner* — Tien Dinh
*Assistant Examiner* — Michael Kreiner
(74) *Attorney, Agent, or Firm* — Dwayne E. Rogge; Schacht Law Office, Inc.

(57) ABSTRACT

Disclosed herein is a divider utilized to provide part of a visual separation between sections of a passenger cabin of a commercial aircraft, the divider comprising several components. One component is a support arm fixedly connected to the frame of an aircraft above a passenger seat. Another component may be a curtain attached to a lower edge of the support arm and projecting vertically below the support arm. Yet another component may be a rigid view block adjacent the face of the luggage stowage compartment and configured to move therewith such that the view block is adjacent the face of the luggage stowage compartment while the luggage stowage compartment is in a closed position, and repositions with the face of the luggage stowage compartment when the compartment is opened.

8 Claims, 13 Drawing Sheets

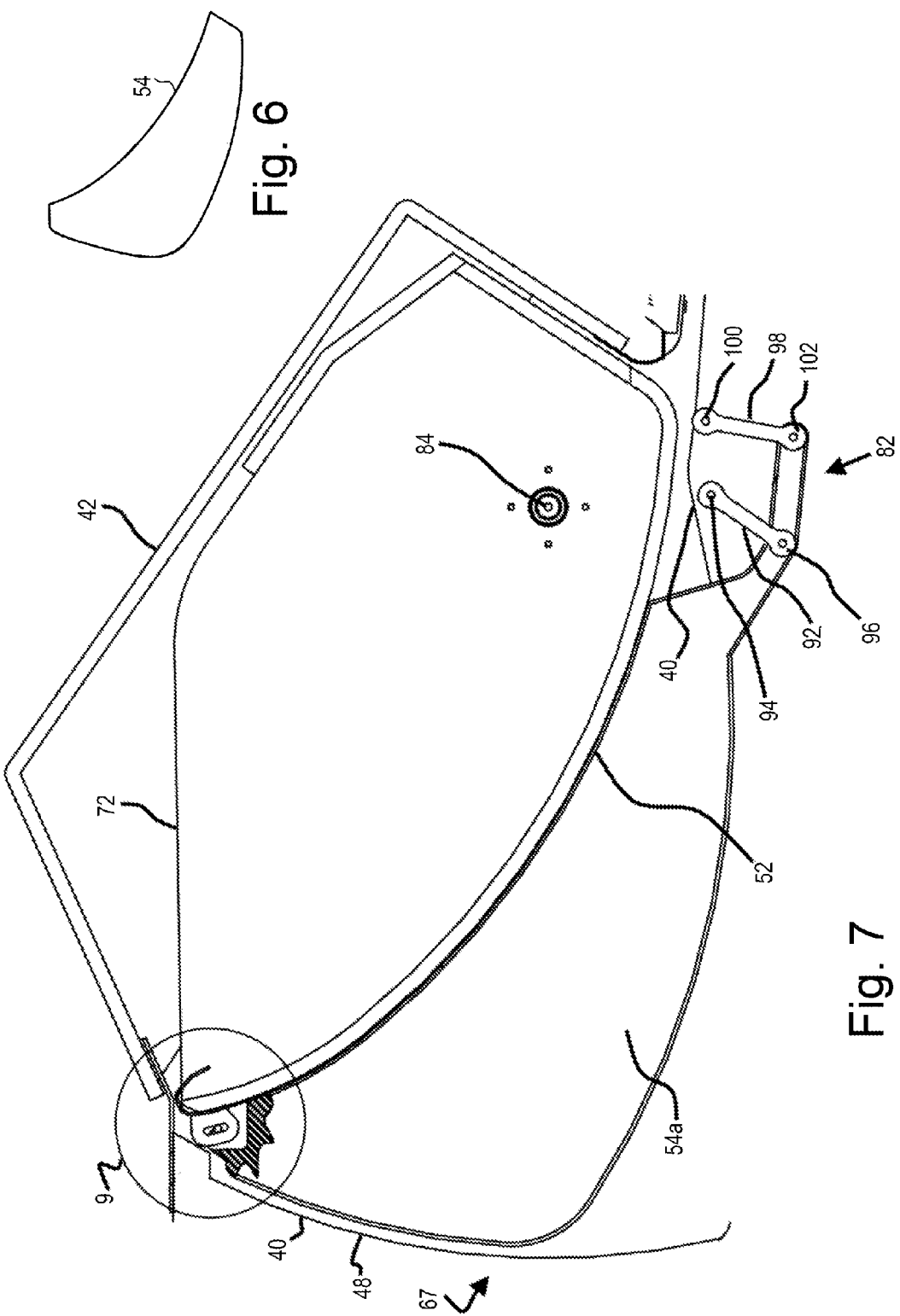

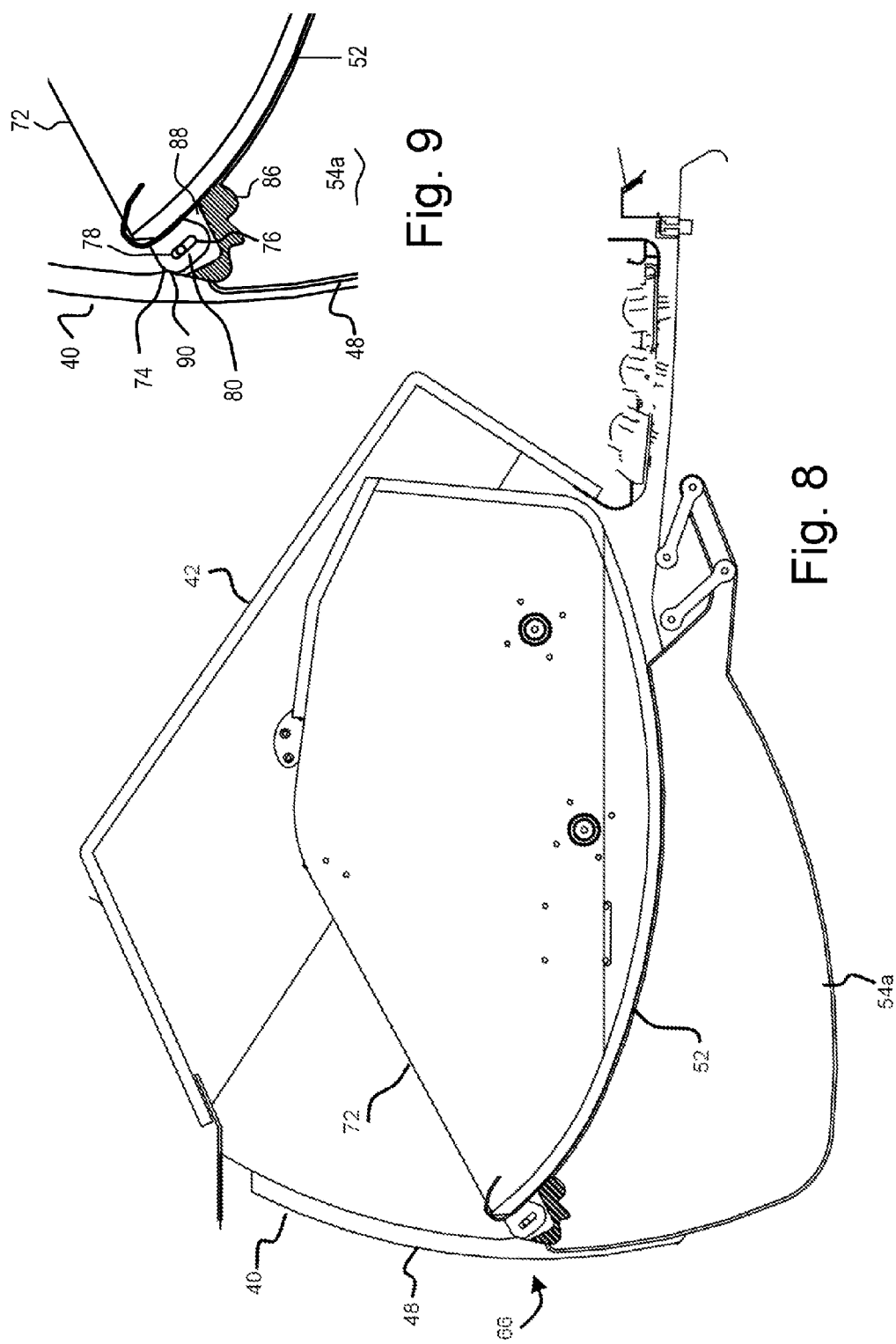

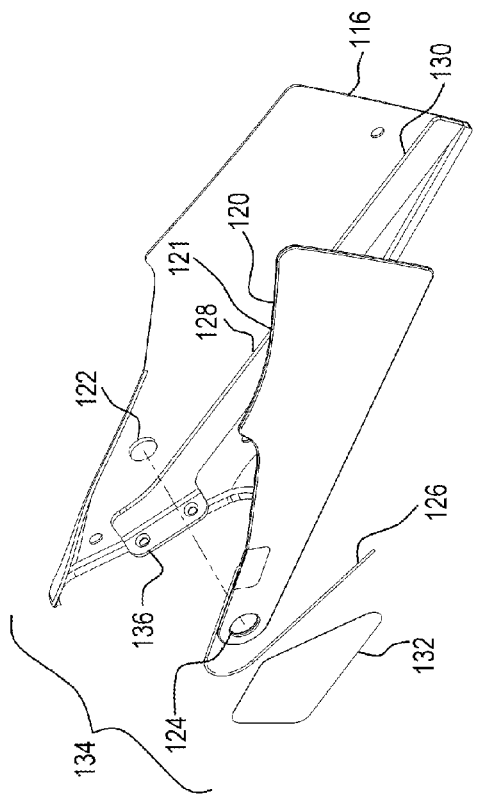
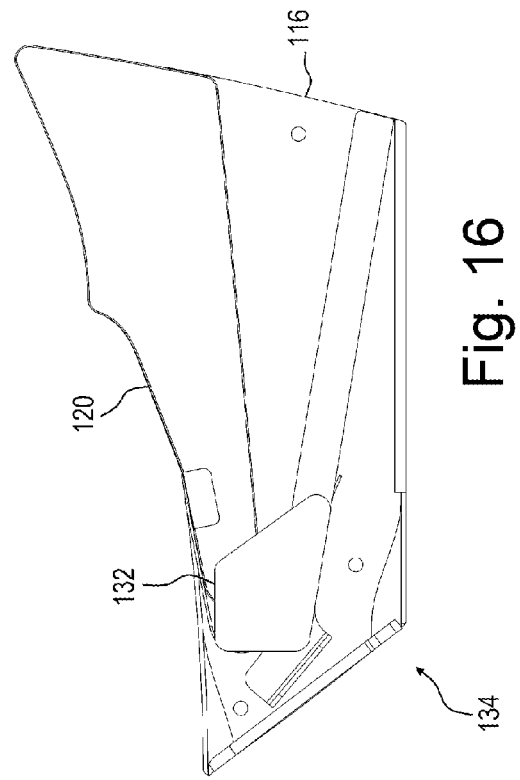
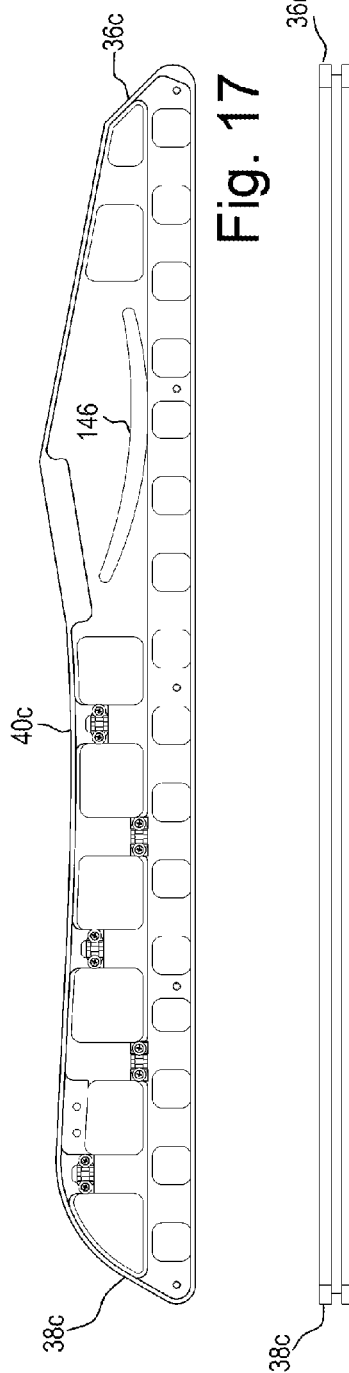
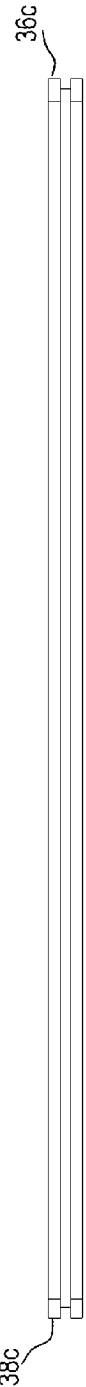

AIRCRAFT CLASS DIVIDER

BACKGROUND OF THE DISCLOSURE a) Field of the Disclosure

This disclosure relates to the field of class dividers, such as those used in passenger cabins of commercial aircraft to divide passenger sections.

SUMMARY OF THE DISCLOSURE

Disclosed herein is an aircraft cabin divider shown with several examples. The cabin divider utilized to provide part of a visual separation between sections of a passenger cabin of a commercial aircraft. The cabin divider comprises several inter-operating components.

In one example, a support arm which is fixedly connected to the frame of an aircraft above a passenger seat. The support arm having an outer edge facing the aisle of the passenger cabin and an inner edge which is adjacent the face of a luggage stowage compartment when the bucket is in an open position. Another component may be a rigid or fabric curtain attached to a lower edge of the support arm and projecting vertically below the support arm. Yet another component may be a rigid view block adjacent the face of the luggage stowage compartment and configured to move therewith such that the view block is adjacent the face of the luggage stowage compartment while the luggage stowage compartment is in a closed position, and repositions as the stowage compartment is opened. Such curtains may be opaque, but to allow sky marshals, airline employees, and others to see from cabin section to cabin section, the curtains may be translucent or substantially transparent. In the example shown in FIG. 10, a mesh pattern is printed on a translucent rigid divider used to create an obvious separation between cabin sections which can easily be seen through.

The cabin divider as recited above may be arranged wherein the view block is attached to the face of the luggage stowage compartment to move therewith. The view block pivots with the face of the luggage stowage compartment to move in conjunction therewith.

The cabin divider as recited above may be arranged wherein the curtain is rigid. The divider may alternatively be arranged wherein the curtain comprises fabric or other non-rigid materials. In either case, the curtain may be positionably attached to the support arm. The curtain may be made opaque, translucent, transparent, or combinations thereof.

The cabin divider as recited above may be arranged wherein the curtain extends from the lower edge of the support arm, downward substantially toward the top of the back of a passenger seat such that the passenger seat cooperates with the cabin divider to visually separate the sections of the aircraft passenger cabin.

The cabin divider as recited above may be arranged wherein the support arm comprises a surface or surfaces defining a gap in a lower edge thereof to allow passage of a portion of the view block therethrough. Alternatively, the view block may pass adjacent either the forward or rearward side of the support arm.

BRIEF DESCRIPTION OF THE DRAWINGS

FIG. 6 is a face view of a view block component of FIG. 1.
FIG. 7 is a face cutaway view of a second embodiment of with the luggage stowage compartment in a closed position.
FIG. 8 is a face cutaway view of the embodiment of FIG. 7 with the luggage stowage compartment shown in a closed position.
FIG. 9 is a cutaway detail view of an upper attachment device as shown in area 9 of FIG. 7.
FIG. 13a is a detail view of the region 13a of FIG. 13.
FIG. 15 is an assembly view of the embodiment of FIG. 11.
FIG. 16 is an assembled view of the components shown in FIG. 15.
FIG. 17 is a detail view of the support arm shown in FIG. 14.
FIG. 18 is a plan view of the support arm shown in FIG. 14.

DESCRIPTION OF THE PREFERRED EMBODIMENTS

Figure 1:
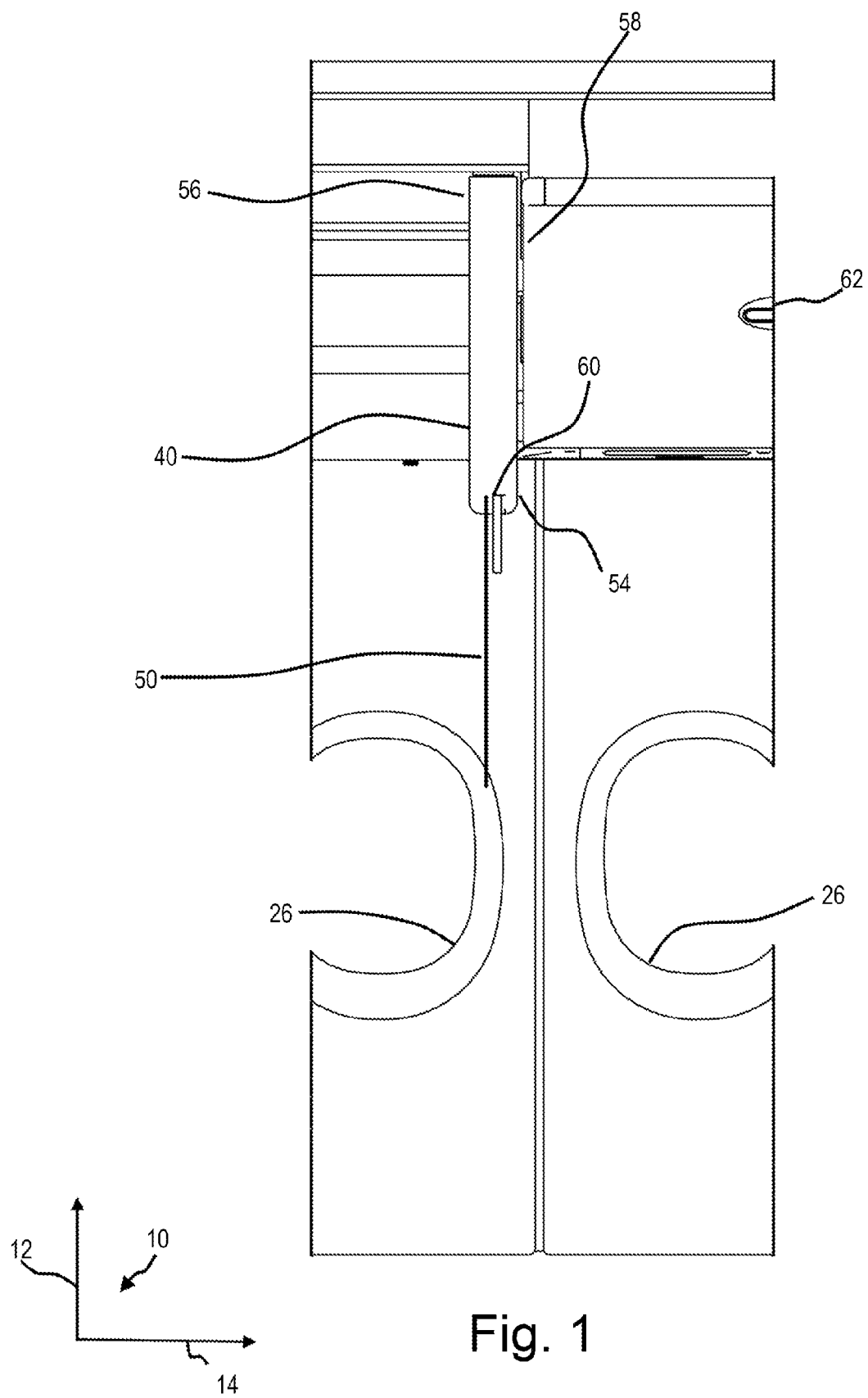
FIG. 1 is an end view of one embodiment of the invention.

Before beginning a detailed description of the components, an axes system 10 is shown in the drawings to facilitate explanation of the relative positioning of the components. The axes system 10 utilizes a vertical axis 12, and a transverse axis 16 lying in a horizontal plane and generally orthogonal to the longitudinal axis of the aircraft body. The axes system 10 also comprises a longitudinal axis 14, in a horizontal plane and generally parallel to the longitudinal axis of the aircraft body. The relative terms inboard and outboard are used to describe relative positioning relative to the plane containing the longitudinal axis and the vertical axis and passing down the center of the aircraft. These relative terms are used in reference to bins (buckets) attached at positions adjacent the hull of the aircraft, although other attachment positions and orientations are still within the scope of the disclosure. This axes system the relative terms, and the axes defined are not intended to limit the disclosure, but are used to aid in description only.

Figure 2:
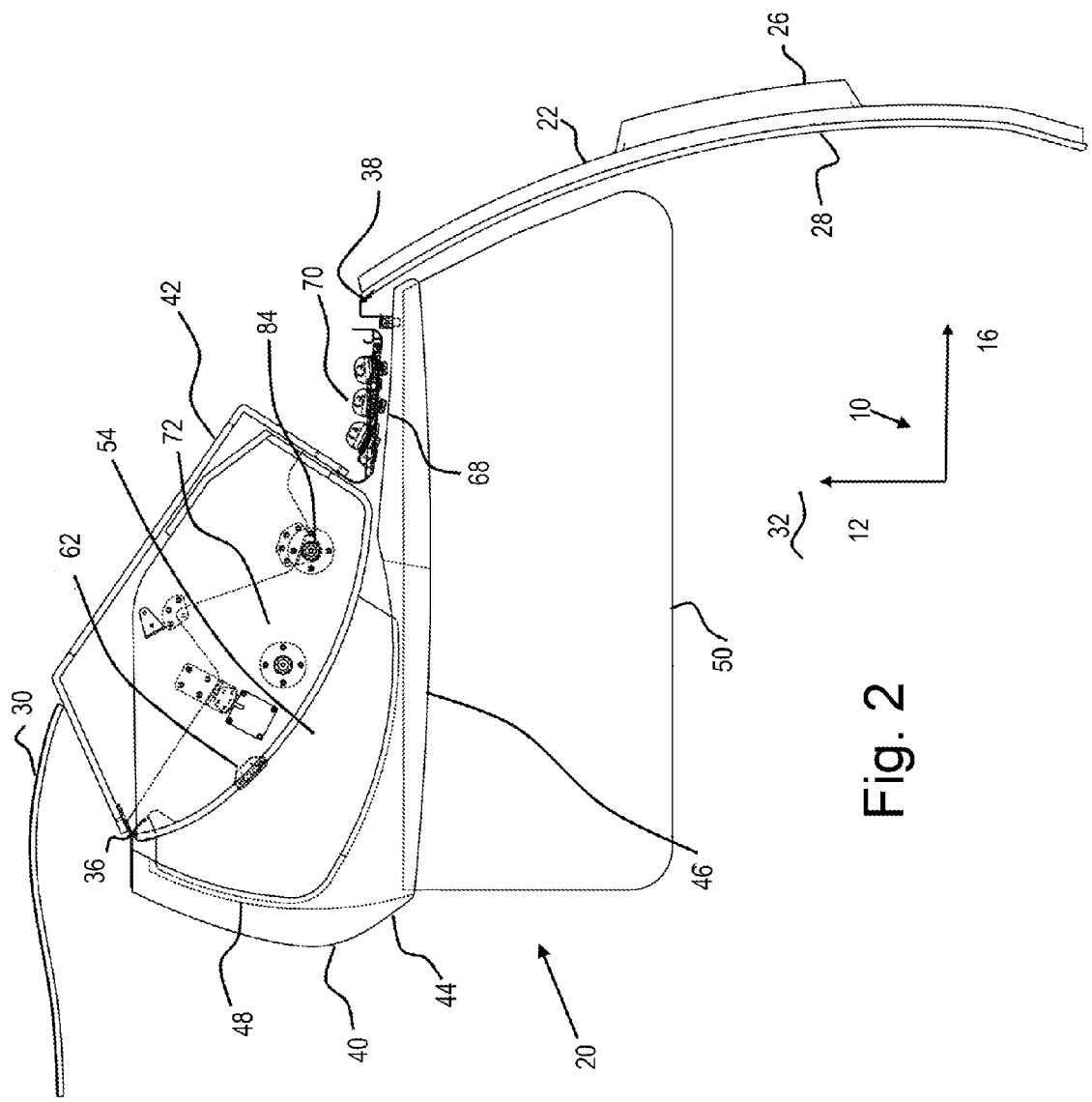
FIG. 2 is a face cutaway view of the embodiment of FIG. 1 with a luggage stowage compartment in a closed position.

Looking to FIG. 2, the cabin divider 20 is shown attached to the frame 22 of an aircraft 25 through the luggage stowage compartment 42. A plurality of windows 26 are also attached to the frame, as well as an inner sidewall 28 and ceiling 30. While the cabin divider 20 may be attached to the frame through the sidewall it may also be attached through the luggage stowage bins as shown, through the seats, flooring, or other components within the passenger cabin 32. The embodiment shown engages a luggage stowage compartment 42 at one end 36, and the frame at a second end 38 adjacent the PSU. The cabin divider 20 may alternatively be attached directly to the inboard passenger service unit rail.

Other types of visual blocks have been previously used to separate different sections of an aircraft passenger cabin, such as curtains which are often used to separate the First Class section from the Coach cabin. One such cabin divider is described in U.S. Pat. No. 5,165,626. The advent of bucket style luggage stowage compartments 42 has resulted in many of these cabin dividers being less than satisfactory in use. In the newer bucket style compartments, where the luggage bucket itself repositions when opening, such cabin divider/curtain combinations often interfered with operation of the bucket, were therefore difficult to operate properly, and often did not function well. Prior shelf-style compartments such as shown in the '626 patent did not cause such problems in prior cabin divider use and operation, as the compartment door opened inward and upward, but the lower section of the compartment was generally stationary.

Figure 10:
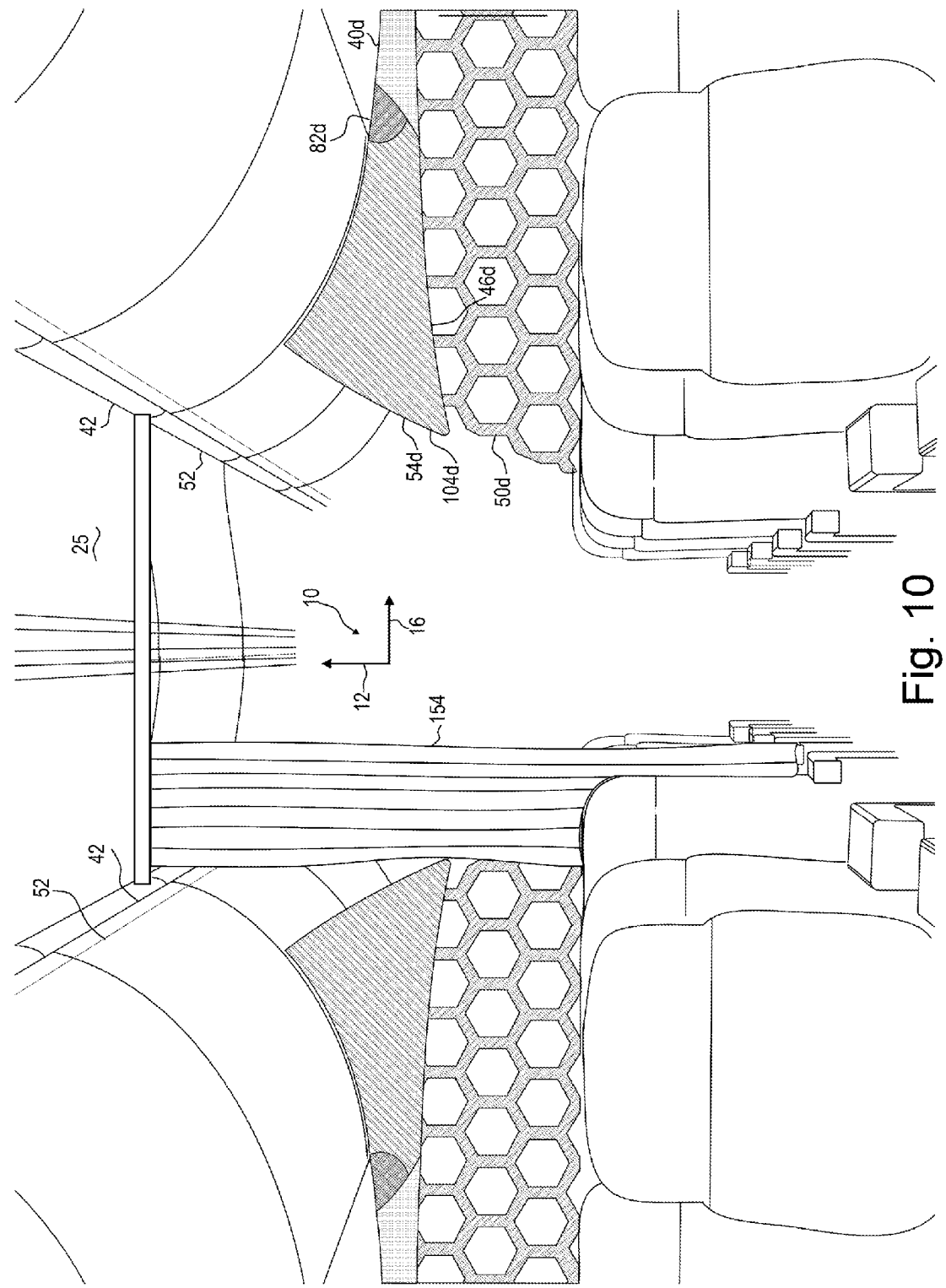
FIG. 10 is a highly schematic environmental view of a third embodiment of the cabin divider.

The cabin divider shown herein may be used in conjunction with an aisle way curtain 154 as shown in FIG. 10, and generally overcomes the challenges faced by the implementation of bucket style luggage compartments.

The cabin divider in the example of FIG. 2 comprises a support arm 40 which as previously mentioned may attach at a first end 36 to the luggage stowage compartment 42. The support arm may alternatively attach to other components of the aircraft 25. The second end 38 of the support arm 40 may be attached to the frame 22, compartment 42, or other components of the aircraft 25. The support arm 40 has an outer edge 44 adjacent the aisleway of the aircraft passenger cabin, a lower edge 46 adjacent a curtain 50, an inner edge 48 forming a cutout to allow the face 52 of the stowage compartment 42 to open without interference. As it may be desired to position the cabin divider 20 at any position along the compartment 42, this arrangement is beneficial in many aspects. It will usually be advantageous to avoid positioning the cabin divider 20 where it may interfere with the latches 62 of the compartment faces, and/or the passenger service units (PSU) 68 which often utilize lights 70 as seen in FIG. 2. In one embodiment, the cabin divider is positioned above the seat back of a passenger seat, where it is unlikely to interfere with a PSU.

In one form, the curtain 50 is attached to and supported by the lower edge of the support arm 40. The curtain 50 may be comprised of a rigid material such as wood, polymers, resin impregnated fiberglass, or alternately be a non-rigid material such a woven fabric, thin sheet polymers, or equivalents of either sort. When non-rigid materials are used, the curtain may be positionably attached to the support arm, such as by rings, sliders, or equivalents so as to be repositionable. During take-off and landing for example, it may not be desired to obscure the view of air marshals and crew between sections of an aircraft. Thus the curtain may be repositioned. The curtain may extend downward a short distance, all the way to the floor of the passenger cabin, or may extend to the top of a passenger seat-back in such a way that the seat back in a fully upright position provides additional view separation between sections of the aircraft.

To visually block the region between the support arm 40 and the face 52 of the compartment 42, a positionable view block 54 may be utilized. The view block may be attached to the face 52 of the compartment 42, or it may be pivotably connected to the support arm 40, with a resilient member such as a spring to bias the view block 54 against the face 52 of the compartment 42.

Figure 3:
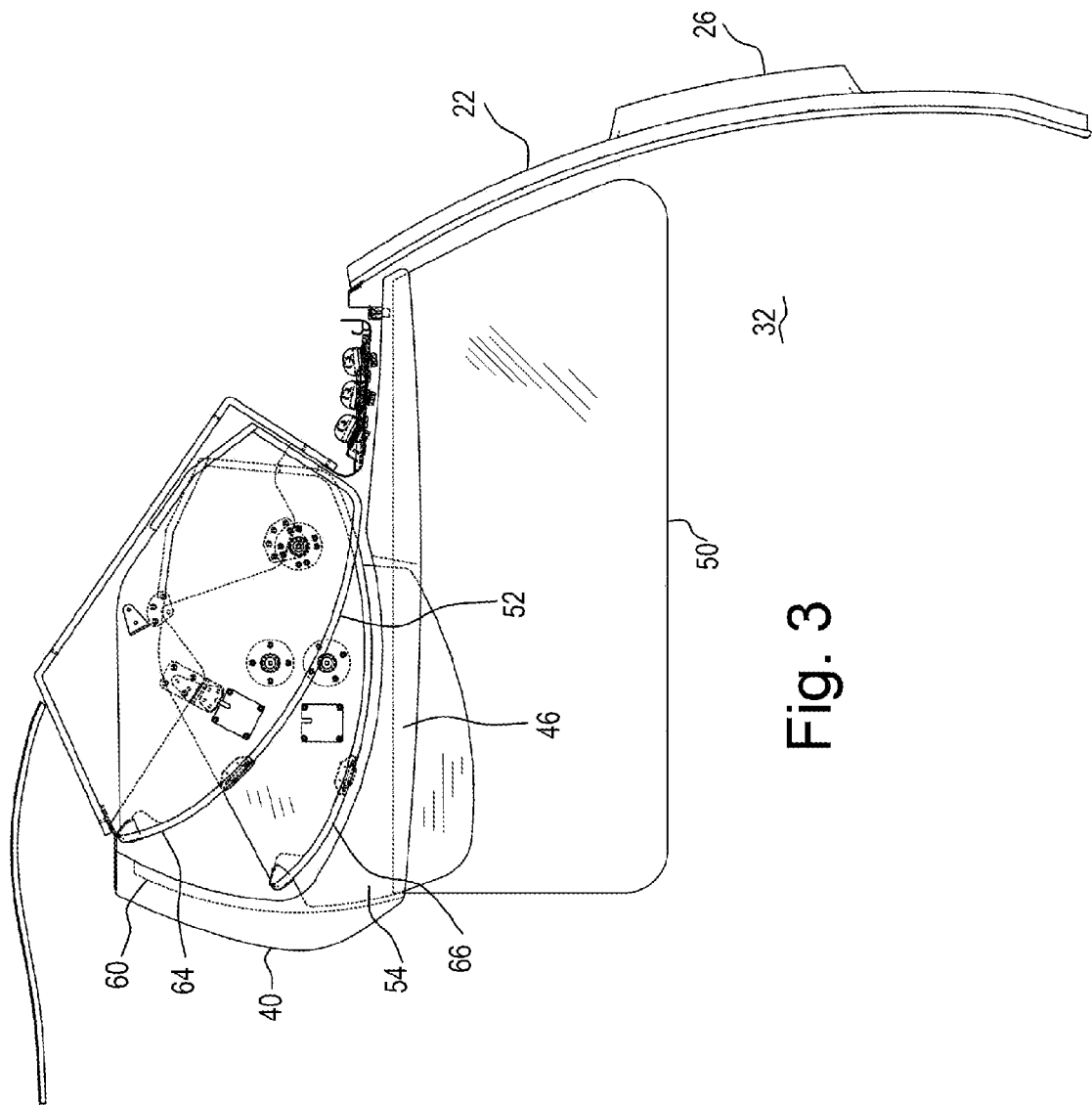
FIG. 3 is a face cutaway view of the embodiment of FIG. 1 with the luggage stowage compartment shown in an open position, and in a closed position.
Figure 4:
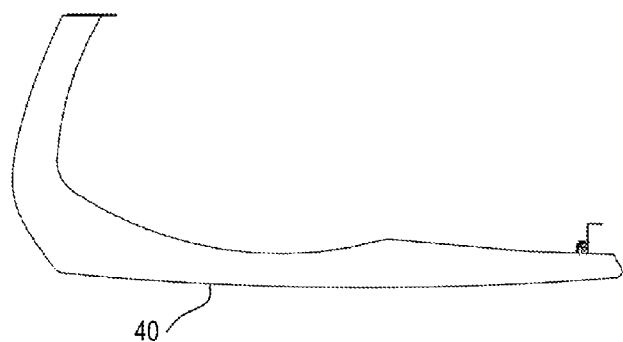
FIG. 4 is a face view of a support arm component of the embodiment of FIG. 1.
Figure 5:
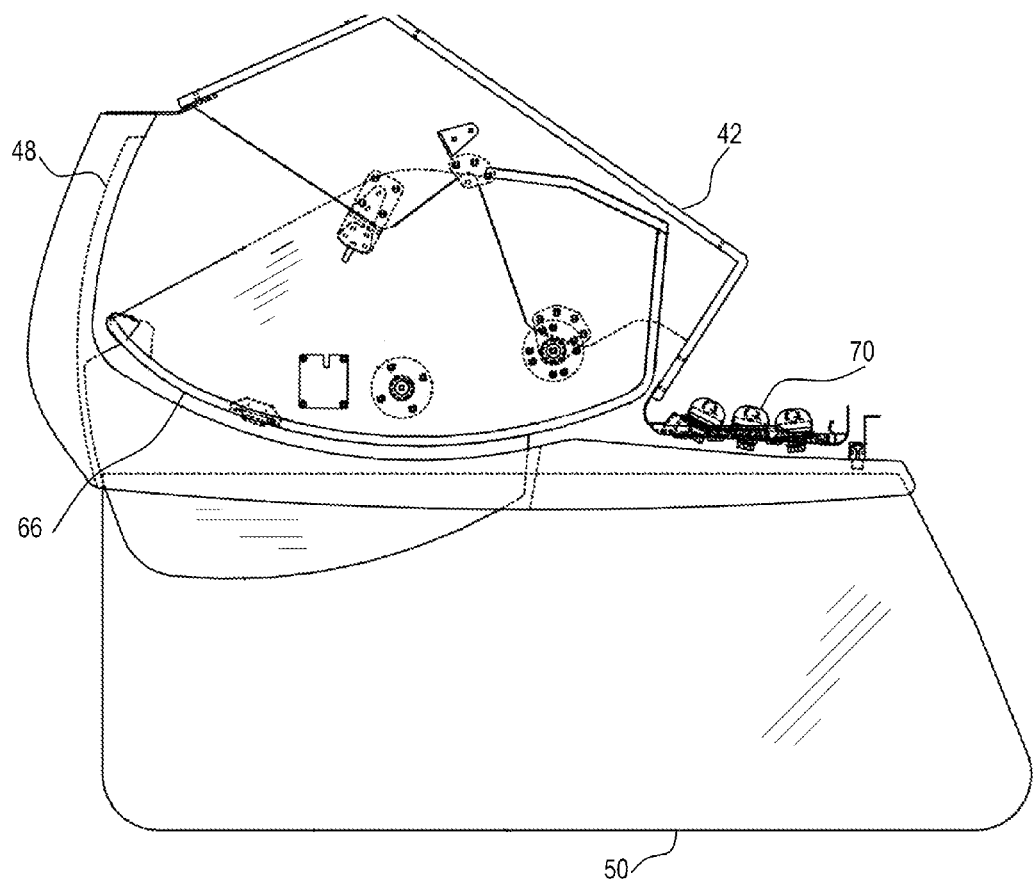
FIG. 5 is a face view of the embodiment of FIG. 3 with several components removed.

While the view block 54 may be adjacent either the forward side 56 (FIG. 1) or rearward side 58 of the support arm 40, one embodiment (FIG. 3) utilizes a gap 60 in the the support arm 40 for the view block 54 to extend into and possibly extend beyond as shown in FIG. 3. Thus, when the compartment 42 is closed, the view block 54 may extend only a short distance into the gap 60. When the compartment 42 is opened, as shown in one example in FIG. 3, the view block repositions from the closed compartment position 64 shown in FIG. 2, to the open compartment position 66 shown in FIG. 3 and FIG. 5.

The view block in one form may also reposition from an extended position when the compartment 42 is closed, to a position substantially within, and possibly not extending beyond, the support arm 40 and/or curtain 50.

A second example is shown in FIGS. 7, 8 and 9. In this second embodiment, components similar to those in the first embodiment are denoted with an "a" suffix. For example, the view block of the first embodiment is labeled as 54, while the view block of the second embodiment is labeled as 54a.

In this second embodiment, the view block 54a is attached to the face 52 of the bucket 72 in a very different manner. In this embodiment a bracket 74 is attached to the face 52 of the bucket 72 by way of fasteners, adhesive, or by clamping to the upper edge of the bucket face 52. The bracket 74 extends generally orthogonal to the face 52 of the bucket 72 and provides an attachment location 76 for the view block 54a to attach to, again by way of fasteners, adhesive, or the bracket 74 may be molded with the view block 54 as a unitary structure.

In the embodiment of FIG. 9, the bracket 74 comprises a surface defining a slot 78 which receives a guide pin 80 which is allowed to reposition somewhat therein. This slot 78 is provided where the outboard attachment mechanism 82 is not aligned with the pivot 84 (FIGS. 2/7) of the bucket 72 to allow some degree of relative motion between the view block 54a and the face 52 to avoid binding during operation (opening and closing) of the bucket 72.

In FIG. 9, the view block 54a is cutout (86) to show an internal channel 88 which receives the transversely extending portion 90 of the bracket 74 to aid in structural support, and to prohibit small items such as fingers from getting caught (pinched) in the apparatus during operation. The guide pin 80 in this embodiment passes through this channel 88.

The example of an outboard attachment location 82 shown in FIG. 7 comprises an offset four bar linkage which provides for rotation and movement of the view block 54a in a similar arc to that transcribed by the pivot 84. The four bar linkage comprises a plurality of link arms. The first link arm is an inboard link arm 92, attached to the support arm 40, frame 22, compartment 42, or other portions of the aircraft at an upper attachment location (pivot) 94; and at a lower attachment location (pivot) 96 to the view block 54a. The second link arm is an outboard link arm 98, attached to the support arm 40, frame 22, compartment 42, or other portions of the aircraft at an upper attachment location (pivot) 100; and at a lower attachment location (pivot) 102 to the view block 54a. As the distance between the axes of the upper pivots 94/100 is less than the distance between the lower pivots 96/102, the effective pivot radius of the view block 54a will be similar to the pivot radius of the bucket pivot 84. Thus there will be very little relative motion between the face 52 of the bucket 72 and the view block 54a.

Generally, the view block 54a engages a support arm 40 as shown in FIG. 2 and described above.

Figure 11:
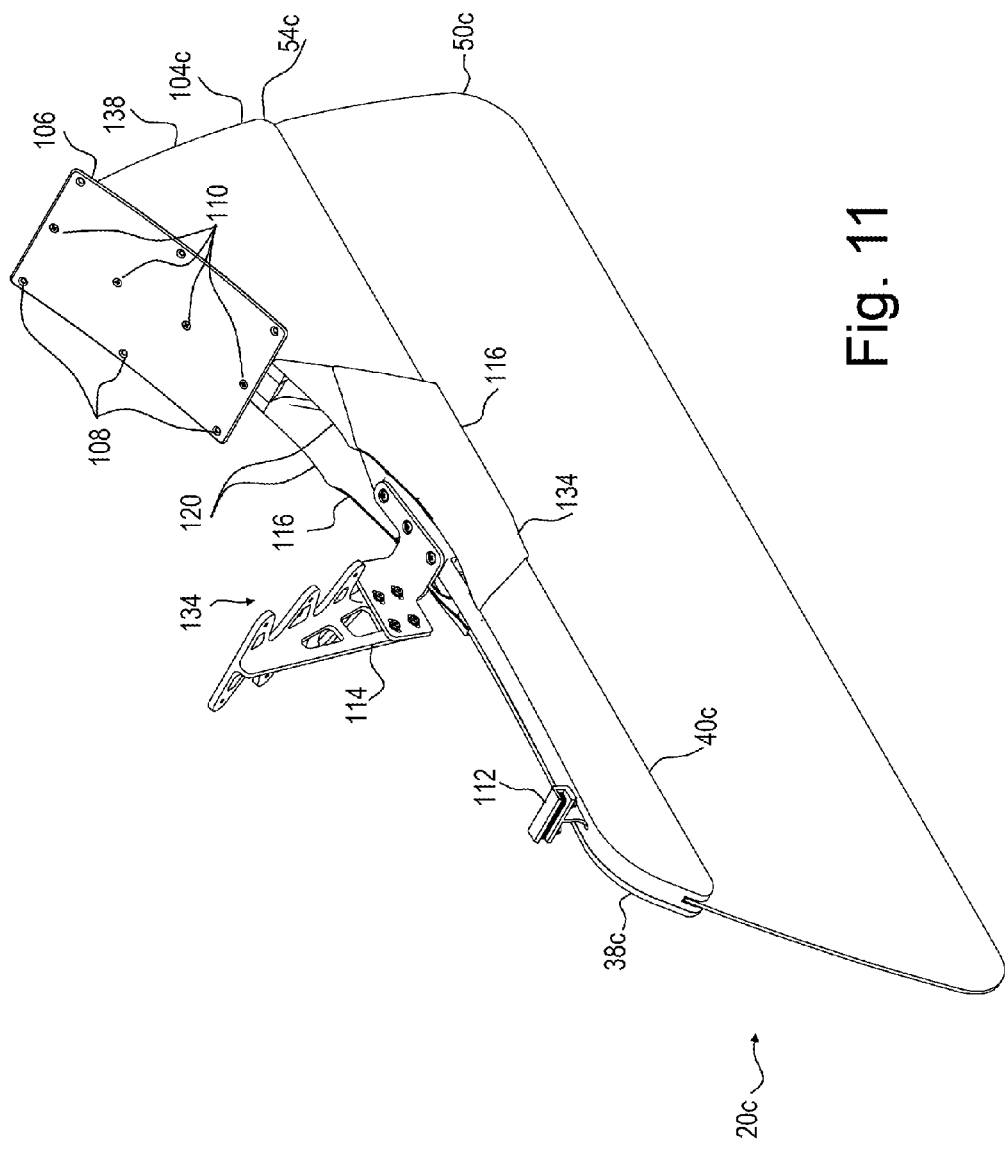
FIG. 11 is an isometric view of a slightly different version of the embodiment shown in FIG. 10.
Figure 12:
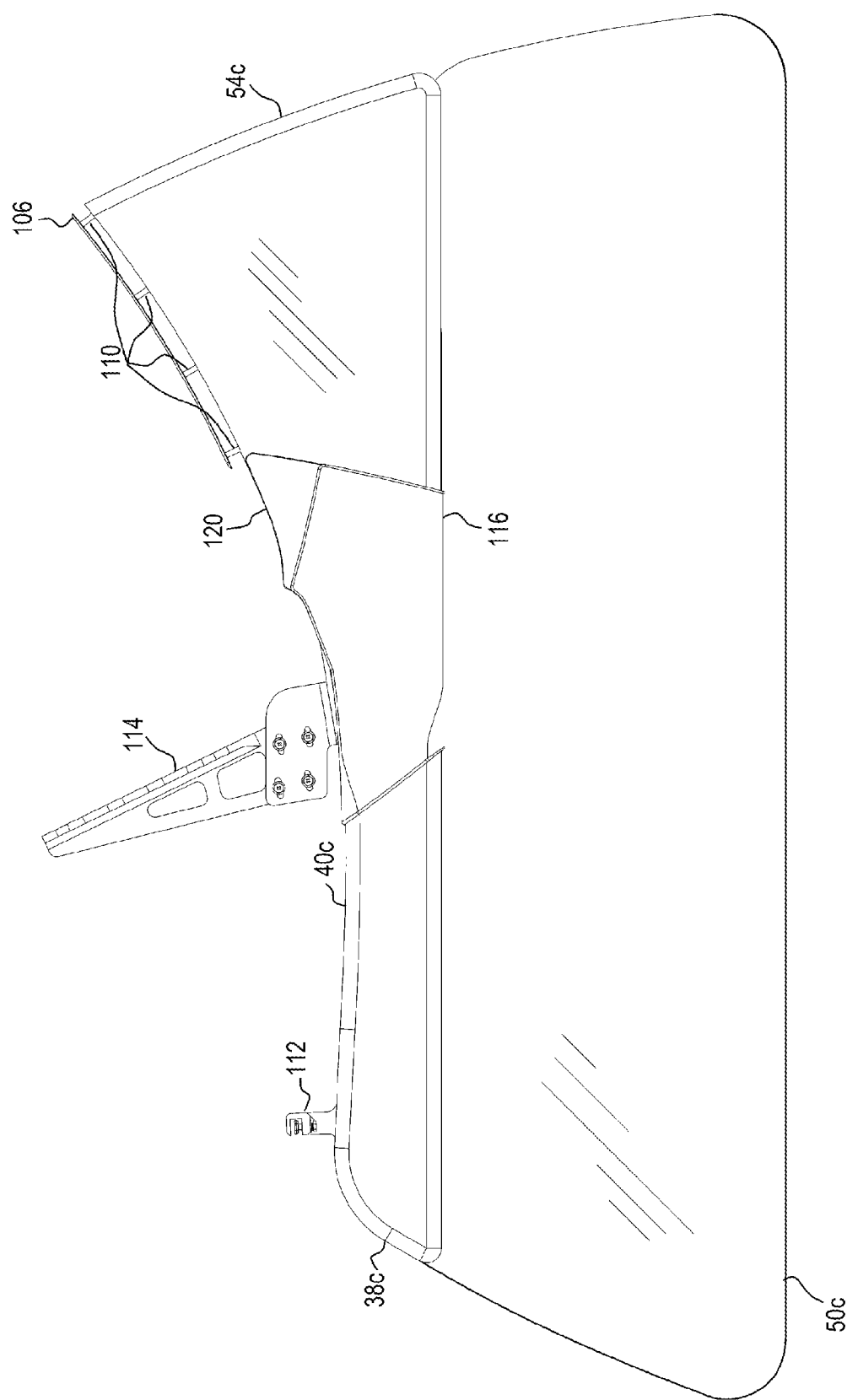
FIG. 12 is a side view of the embodiment shown in FIG. 11.
Figure 13:
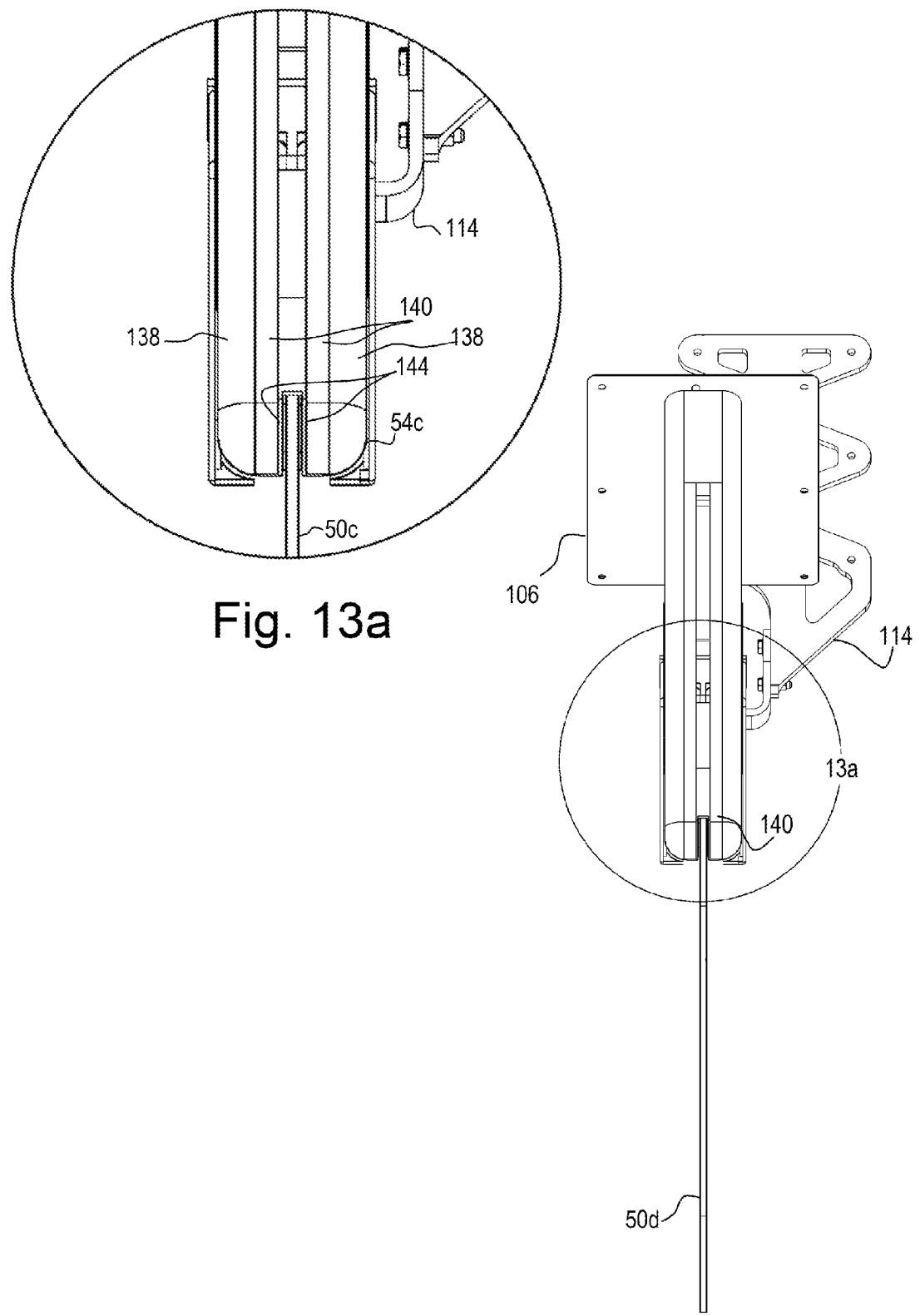
FIG. 13 is an end view of the embodiment shown in FIG. 11

In the example shown in FIGS. 11-18 another example is shown. In this example, elements with similar function to previous examples are identified with the same number, and a suffix of "c". For example, the curtain shown in FIG. 2 is labeled 50, while the curtain of FIG. 11 is labeled 50c and generally serves the same function but is clearly ornamentally and structurally different. As the aisleway curtain 154 is generally known in the art, it will not be described although the divider 20 will generally cooperate with an aisleway curtain 154. The view block curtain of the example shown in FIG. 10 is functionally similar to the example of FIG. 11, but different in structure and ornamental design, and is therefore numbered 50d.

The same axis system is used as is used in previous examples, along with the same labels for the same elements, such as the aircraft 25, luggage stowage compartment 42 and compartment face 52.

In the example shown in FIG. 10 the positionable view block 54d is attached to the front face 52 of the luggage stowage compartment 42. The view block component is in contact with the support arm 40d and is not supported on its inboard edge 104d by the support arm 40d. Rather, the inboard edge 104d is fixed to the face 52 of the luggage stowage compartment 42. The positionable view block 54d may be in sliding contact with the support arm 40d at an outboard end 106d as will be described. A joint connection 82d is shown and will be structurally and functionally described in reference to the example shown in FIGS. 11-18.

Looking to FIG. 11 is shown an example of a divider 20 providing a separation between compartments of an aircraft. The divider 20 comprising a curtain 50c, a view block 54c, and a support arm 40c which are commonly adjacent an aisleway curtain 154. These components cooperate to provide visual and some acoustic separation between compartments, but when not made of opaque materials do not provide a visual obstruction for sky marshals and flight staff, who for security and safety, may need to see between compartments.

The view block 54c of this example is attached by way of fasteners 110 to the luggage stowage compartment 42. A backing plate 106 may be positioned inside the stowage compartment 42 and reinforce the attachment to the view block 54. In this example, fasteners 108 may be used to attach the backing plate 106 to the inside surface of the face 52 of the compartment 42. The view block 54c may fit forward of, rearward of, or on both sided of the curtain 50c when the compartment 42 is opened.

In this example, the support arm 40c is attached to the frame 22 of the aircraft 25 (FIG. 10) through a PSU rail 156 (FIG. 2) via a bracket 112 on the first end 38c of the support arm 40c. Likewise, the median portion of the support arm 40 is attached to the frame 22 through the back side 158 (FIG. 2) of the bucket 72 via a bracket 114, such as to the outboard side of the luggage compartment. While the first end 36c of the support arm 40c is obscured from view in FIG. 14 by a cover plate 116 (FIG. 15), it can be seen in FIG. 14 where the cover plate 116 closest to the viewer has been removed.

Figure 14:
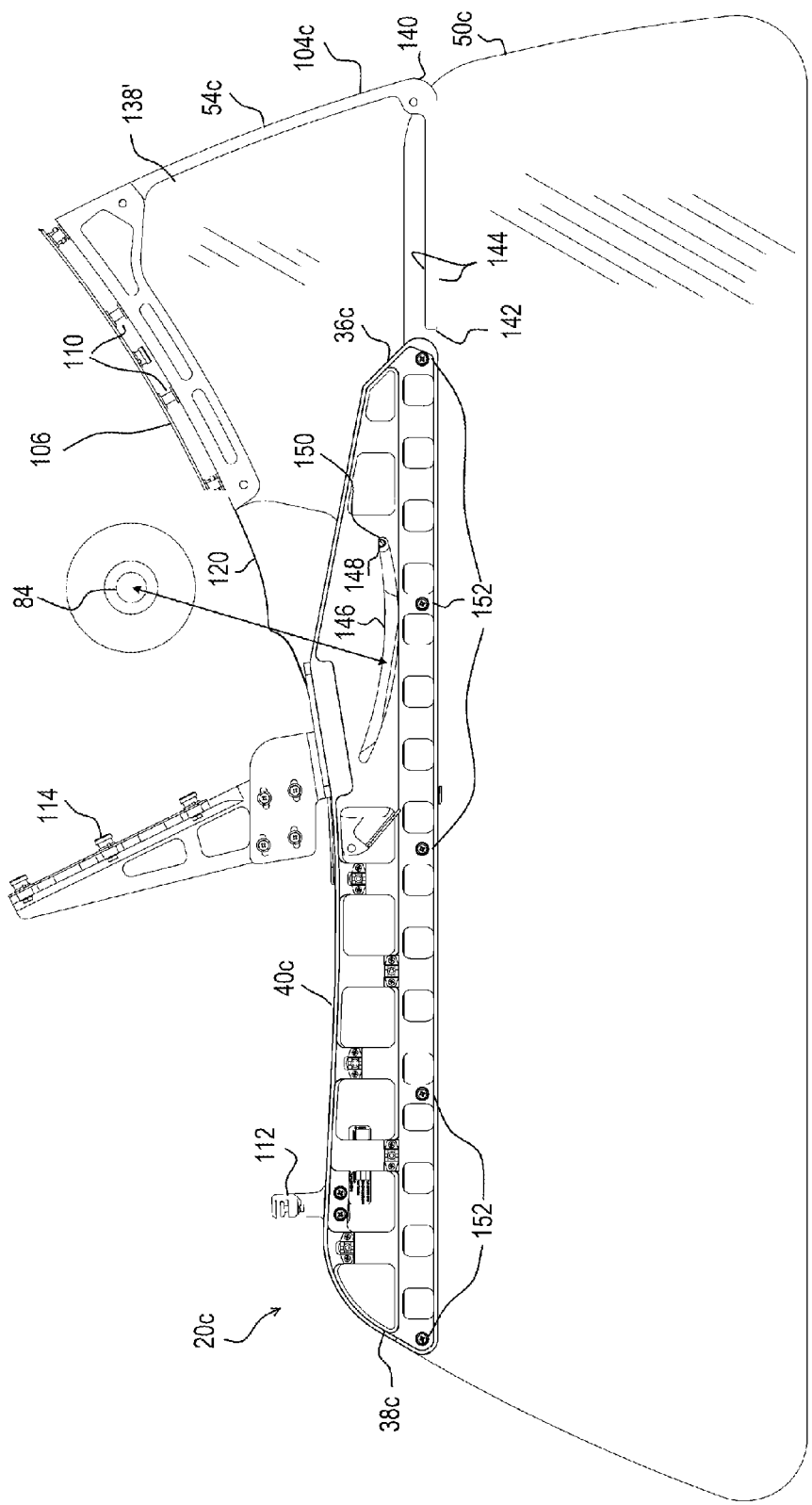
FIG. 14 is a cutaway view of the embodiment shown in FIG. 11.
Figure 20:
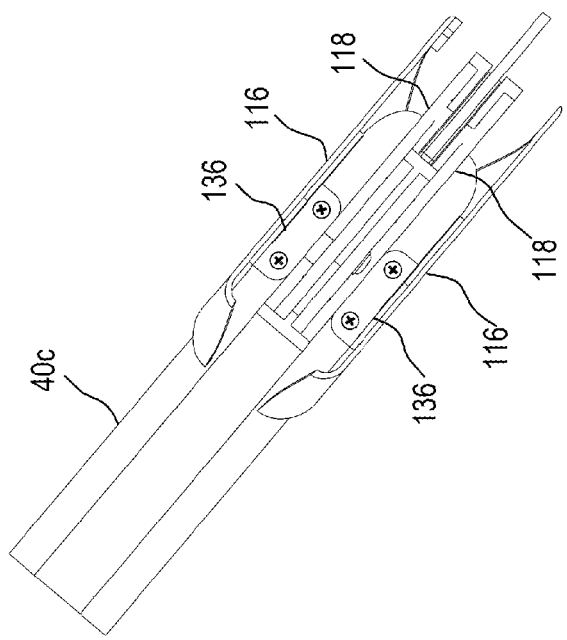
FIG. 20 is a sectional view taken along line 20-20 of FIG. 19.
Figure 19:
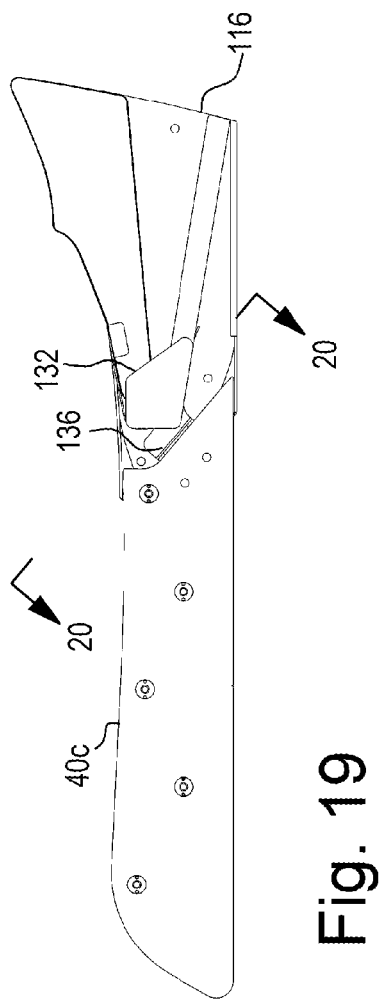
FIG. 19 is a top detail view of the components shown in FIG. 11.

Looking to FIG. 14, the first end 36c of the support arm 40c can be seen. In this area the support arm 40c slides between the sides of the view block 54c. A small friction-reducing component may be provided there between to avoid scratching the curtain 50c and to aid in opening and closing of the stowage compartment 42. This arrangement can more easily be understood by looking at the example of FIG. 13 and the detail view of FIG. 13a which show the longitudinal spatial arrangement of the components being discussed here. In particular the relationship between the support arm 40c the cover plates 116 (FIG. 11), and a pair of pivot plates 120. Each of these can be seen in FIG. 15 from a different angle in an exploded view. In this example, the pivot plates 120 have an upper surface 121 which engages the face 52 of the compartment 42. Due to cooperation of the axle 122, bushing 124, and compression spring 126, the surface 121 remains in contact with the face 52 as the compartment 42 is opened and closed. In the example shown, the compression spring 126 rests against an upper surface 130 of a support arm 130 which may be fixed to the cover plate 116. In at least one example an inner pivot cover 132 is provided to keep the bushing 124 upon the axle 122 and to maintain the spring 126 against the support arm 130.

Each cover plate 116, pivot plate 120, compression spring 126, support arm 130 and inner pivot plate 132 cooperate to form a cover assembly 134. The cover assembly encloses any gap between the view block 54c and the luggage stowage compartment 42. In other examples, the cover assembly may be omitted, and the view block 54c reconfigured to cover the entire area.

As in the example of FIG. 11, a cover assembly 134 may be provided on either side of the view block 54c to move in cooperation therewith. Each of the cover assemblies may utilize a bracket 136 to attach the cover assembly 134 to the support arm 40c as can be seen in FIG. 15.

Looking to FIG. 14, an example of the view block 54c can be seen constructed in a hollow core manner. In this example, shown in cross-section, a first cover panel 138 (See FIG. 11) is not shown so that the opposing cover panel 138' can be seen along with a separating frame 140. The separating frame of this example has surfaces defining a gap 144. This gap 144 allows the view block 54c to pass on either side of the inboard portion of the curtain 50c. Also in this example, an outboard edge 142 is adjacent the first end 36c of the support arm 40. This arrangement aids in positioning the view block around the curtain 50, and may aid in keeping debris and body parts out of the area therebetween.

As the view block 54c of this example is attached to the compartment 42, and as the compartment repositions as described above, the axis of rotation of the view block 54c in one example will be at the pivot 84. Thus, an arcuate channel 146 may be provided, centered upon the pivot 84 so as to allow adjustment of a slider 148 and screw 150. This slider 148 adds additional stability to the divider 20c.

In one example, the curtain 50c is attached to the support arm 40c by way of fasteners 152.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. A cabin divider utilized to provide partial a separation between sections of a passenger cabin of an aircraft, the divider comprising:
   a. a support arm fixedly connected to the frame of an aircraft in a plane above a passenger seat and below a luggage stowage compartment;
   b. a curtain attached to a lower edge of the support arm and projecting vertically below the support arm and extending transversely inward beyond the support arm towards an aisleway;
   c. a rigid view block attached to the face of a luggage stowage compartment, extending vertically downward therefrom, and configured to move therewith such that the view block is in contact with the face of the luggage stowage compartment while the luggage stowage compartment is in a closed position, and repositions with the stowage compartment when the stowage compartment is opened, and;

d. wherein at least a portion of the view block is vertically higher than the support arm when the luggage stowage compartment is in the closed position and at least a portion of the view block is vertically lower than the support arm when the luggage stowage compartment is in the open position.

2. The cabin divider as recited in claim 1 further comprising a bracket fixedly connecting an inboard end of the view block to the face of the luggage stowage compartment.

3. The divider as recited in claim 1 wherein the curtain is rigid and fixed in position below the luggage stowage compartment.

4. The divider as recited in claim 1 wherein the curtain comprises fabric.

5. The divider as recited in claim 1 wherein the curtain extends from the lower edge of the support arm, downward substantially to the top of the back of a passenger seat such that the passenger seat cooperates with the divider to visually separate but not prevent viewing between the sections of the aircraft passenger cabin.

6. The divider as recited in claim 1 wherein the view block is an assembly formed of longitudinally opposed panels and a frame therebetween to allow passage of a portion of the curtain between the longitudinally opposed panels.

7. A cabin divider utilized to provide a partial separation between sections of a passenger cabin of an aircraft, the divider comprising:
   a. a support arm fixedly connected to the frame of an aircraft above a passenger seat, the support arm having an outer edge facing the aisle of the passenger cabin, and an inner edge which is adjacent the face of a luggage stowage compartment when the bucket is in an open position;
   b. a curtain attached to a lower edge of the support arm and projecting vertically below the support arm;
   c. a rigid view block attached to the face of a luggage stowage compartment, extending vertically downward therefrom, and configured to move therewith such that the view block is in contact with the face of the luggage stowage compartment while the luggage stowage compartment is in a closed position, and repositions with the stowage compartment when the stowage compartment is opened;
   d. a pivot plate having a surface adjacent the face of the luggage stowage compartment, the pivot plate rotatably attached to the support arm;
   e. a spring mechanism biasing the pivot plate toward the luggage stowage compartment; and
   f. wherein the pivot plate is adjacent the view block and rotates about a different axis than the view block.

8. The divider as recited in claim 7 wherein the spring is a compression spring.

* * * * *